(12) United States Patent
Balk

(10) Patent No.: US 9,611,809 B2
(45) Date of Patent: Apr. 4, 2017

(54) CONTRA-ROTATING PROPELLER SYSTEM FOR AN AIRCRAFT TURBINE ENGINE

(75) Inventor: Wouter Balk, Melun (FR)

(73) Assignee: SNECMA, Paris (FR)

( * ) Notice: Subject to any disclaimer, the term of this patent is extended or adjusted under 35 U.S.C. 154(b) by 1308 days.

(21) Appl. No.: 13/520,600

(22) PCT Filed: Jan. 7, 2011

(86) PCT No.: PCT/EP2011/050147
§ 371 (c)(1),
(2), (4) Date: Jul. 5, 2012

(87) PCT Pub. No.: WO2011/083137
PCT Pub. Date: Jul. 14, 2011

(65) Prior Publication Data
US 2012/0288358 A1    Nov. 15, 2012

(30) Foreign Application Priority Data
Jan. 8, 2010 (FR) ..................... 10 00074

(51) Int. Cl.
*B64C 11/48* (2006.01)
*F01D 1/26* (2006.01)
(Continued)

(52) U.S. Cl.
CPC .............. *F02K 3/072* (2013.01); *B64C 11/48* (2013.01); *F02C 3/067* (2013.01); *F02C 3/10* (2013.01);
(Continued)

(58) Field of Classification Search
CPC .. B64C 11/48; F01D 1/26; F05D 2260/40311; F02C 3/10; F02C 7/36; F02K 3/072
(Continued)

(56) References Cited

U.S. PATENT DOCUMENTS 2,394,299 A * 2/1946 Friedrich ............... A43B 13/32
416/127
4,563,129 A   1/1986 Pagluica
(Continued)

FOREIGN PATENT DOCUMENTS

FR   2 551 023   3/1985
FR   2 641 333   7/1990
(Continued)

OTHER PUBLICATIONS

U.S. Appl. No. 13/557,722, filed Jul. 25, 2012, Balk.
International Search Report Issued Feb. 3, 2011 in PCT/EP11/50147 Filed Jan. 7, 2011.

*Primary Examiner* — Sean J Younger
(74) *Attorney, Agent, or Firm* — Oblon, McClelland, Maier & Neustadt, L.L.P.

(57) ABSTRACT

A contra-rotating propeller system for an aircraft turbine engine, including a free power turbine including a first rotor and a second rotor contra-rotating relative to the first rotor, a first contra-rotating propeller and a second contra-rotating propeller to be rotated about a longitudinal axis of the propeller system relative to a stator of the system, and a mechanical transmission device. The mechanical transmission system is provided between the first propeller and the second propeller.

10 Claims, 3 Drawing Sheets

(51) Int. Cl.
    *F02C 3/10*         (2006.01)
    *F02K 3/072*       (2006.01)
    *F02C 3/067*       (2006.01)
    *F02C 7/36*         (2006.01)
    *B64D 27/02*       (2006.01)

(52) U.S. Cl.
    CPC .......... *F02C 7/36* (2013.01); *B64D 2027/026* (2013.01); *F05D 2260/40311* (2013.01); *F05D 2260/96* (2013.01); *Y02T 50/66* (2013.01); *Y02T 50/671* (2013.01)

(58) Field of Classification Search
    USPC ................ 415/65, 68, 69; 416/129
    See application file for complete search history.

(56) References Cited

U.S. PATENT DOCUMENTS

| | | | |
|---|---|---|---|
| 4,657,484 A * | 4/1987 | Wakeman | B64C 11/306 |
| | | | 415/130 |
| 4,751,816 A * | 6/1988 | Perry | F02K 3/072 |
| | | | 416/129 |
| 4,772,181 A | 9/1988 | Poucher | |
| 4,817,382 A | 4/1989 | Rudolph et al. | |
| 4,826,403 A * | 5/1989 | Catlow | F01D 5/03 |
| | | | 415/134 |
| 4,927,329 A * | 5/1990 | Kliman | F01D 7/00 |
| | | | 416/127 |
| 5,010,729 A | 4/1991 | Adamson et al. | |
| 5,079,916 A * | 1/1992 | Johnson | B64C 11/48 |
| | | | 416/129 |
| 5,174,716 A * | 12/1992 | Hora | B64C 11/32 |
| | | | 416/129 |
| 6,082,967 A * | 7/2000 | Loisy | F02C 3/113 |
| | | | 415/68 |
| 6,817,962 B2 * | 11/2004 | Tanikawa | F16H 57/043 |
| | | | 475/159 |
| 7,377,870 B2 * | 5/2008 | Matsushita | F16H 57/0482 |
| | | | 475/159 |
| 9,017,028 B2 | 4/2015 | Fabre | |
| 2006/0223664 A1 * | 10/2006 | Duong | F16H 57/042 |
| | | | 475/159 |
| 2008/0179455 A1 * | 7/2008 | Gallet | B64C 11/306 |
| | | | 244/65 |
| 2009/0211221 A1 * | 8/2009 | Roberge | F02C 3/10 |
| | | | 60/226.1 |
| 2011/0243735 A1 | 10/2011 | Balk et al. | |

FOREIGN PATENT DOCUMENTS

| | | | |
|---|---|---|---|
| GB | 586 557 | 3/1947 | |
| GB | 2 150 980 | 7/1985 | |
| GB | 2 209 371 | 5/1989 | |
| WO | WO 2008120521 A1 * | 10/2008 | ........... F16H 57/043 |

\* cited by examiner

CONTRA-ROTATING PROPELLER SYSTEM FOR AN AIRCRAFT TURBINE ENGINE

BACKGROUND OF THE INVENTION

Field of the Invention

The present invention relates to a contra-rotating propeller system for an aircraft turbine engine.

The invention applies to aircraft turbine engines, e.g. turbojet engine or turbo-prop. More particularly, it applies to turbine engine with <<open rotor>>, wherein a free power turbine drives two contra-rotating propellers, directly or indirectly through a mechanical transmission device as a reducer and notably including a planetary gear train. In these contra-rotating propeller systems, the propellers thus have no fairing at their external radial ends.

Description of the Related Art

Turbine engine with contra-rotating propellers systems are known, propellers of which are driven by a mechanical transmission device which is usually a differential reducer. This differential reducer contains a particular planetary gear train, the sun gear of which is rotatably driven by a rotor of a free power turbine, the planet carrier of which drives the first propeller, and the ring gear of which drives the second propeller. In this respect, it is noted that depending on the position of the contra-rotating propellers with regard to the free power turbine which drives them, the first propeller constitutes the downstream propeller, and the second propeller, the upstream propeller, or vice versa. Be that as it may, unlike a simple planetary gear train, the ring gear is not stationary, but movable.

With such a planetary gear train, both propellers cannot undergo the same aerodynamic torques. The mechanical equilibrium equations of planet gears show that these two torques necessarily have a constant ratio, dependent on geometrical characteristics of the reducer. This ratio is necessarily different from the unitary ratio. Indeed, the ratio between the torque C1 applied to the first propeller and the torque C2 applied to the second propeller is given by the following:

$$C1/C2=(R+1)/(R-1);$$

where R corresponds to the reducing ratio defined by the planetary gear train.

So, in order to achieve a torque ratio close to unit, it is necessary to increase the reducing ratio R, which cannot however, for questions of mechanical feasibility, be greater than 10. Furthermore, the increase of reducing ratio R is inevitably translated by an increase of the global mass of the reducer, penalizing the turbine engine.

Because of the non-unitary ratio between the torques, one of both propellers is going to generate more gyration of the bypass flow than the other propeller, which is translated by a residual gyration of the outlet flow, substantially restraining the propulsion efficiency and adversely increasing the acoustic level of the turbine engine. In fact, it is the first propeller driven by the planet carrier which is always the most loaded in terms of torque.

Besides, this difference between both couples also generates an increased stress on the means used to attach the turbine engine on the aircraft, these means being consequently oversized to withstand to the overload which is applied thereto.

By the French patent application FR 0 858 822 filed on Dec. 19, 2008 by SNECMA company, a propeller system, allowing to fill the lack of torque received by the second propeller, the second propeller being driven by the second rotor of the free power turbine, via the ring gear of the planetary gear train, is known. As a result, the aerodynamic flow is well straightened up while leaving the propeller system. Furthermore, the means used to attach the turbine engine on the aircraft are mechanically less stressed, and consequently can adopt a less expensive design in terms of footprint and mass.

In order to limit the noise of the turbine engine, the engine must include a sufficient gap between upstream and downstream propellers, which increases the length of the turbine engine. Besides, when a propeller is provided with variable setting type blades, the supply of energy (electric or hydraulic) to the setting system passes through the planetary gear train. So, any breakdown of the planetary gear train affects the setting system, which requires specific provisions to avoid hazardous conditions during the flight.

BRIEF SUMMARY OF THE INVENTION

In order to suppress at least some of these drawbacks, the invention relates to a contra-rotating propeller system for an aircraft turbine engine, including:
  a free power turbine including a first rotor and a second contra-rotating rotor relative to said first rotor;
  a first and a second contra-rotating propellers to be rotated about a longitudinal axis of the propeller system relative to a stator of this system, and
  a mechanical transmission device including a planetary gear train including a sun gear concentric with said longitudinal axis and driven by said first rotor of the free power turbine, planet gears meshing with said sun gear, a planet carrier driving said first propeller, and a ring gear meshing with each planet gear, the ring gear, driven by said second rotor, driving said second propeller.

The system is characterized in that the mechanical transmission device is provided between the first propeller and the second propeller. So, the dimensions of the turbine engine can be significantly reduced. Besides, as it is necessary to keep a sufficient gap between the propellers, the dimensions of the mechanical transmission device can be increased so as to limit its complexity and thus the cost. A turbine engine with reduced size and not very complex is obtained.

Thanks to the invention, the presence of a planetary gear train allows to divide by two the number of turbine stages and to decrease its average radius, which considerably reduces the mass of the propeller system.

Preferably, the first propeller is provided downstream to the mechanical transmission device, and the second propeller is provided upstream to the mechanical transmission device. Thanks to this arrangement, the configuration of the planetary gear train is optimized, the turbine engine being compact.

Still preferably, the first rotor of the free power turbine is the internal rotor, and the second rotor of the free power turbine is the external rotor.

Preferably, the free power turbine corresponds to the low pressure turbine of a two-spool turbine engine.

Always preferably, the planet carrier is integral with the first propeller, the ring gear being integral with the second propeller and the second rotor of the free power turbine.

Preferably, the planet carrier is rotatably mounted with regard to the stator via planet carrier bearings, and the ring gear is rotatably mounted with regard to the stator via ring gear bearings. Each of the propellers is so directly supported by the stator, which limits the occurrence of unbalances and vibrations.

Preferably, each propeller includes a variation mechanism for the pitch of the propeller blades, each mechanism being mounted in the stator and axially shifted with regard to the mechanical transmission device. The pitch variation mechanism is advantageously mounted in the stator, which limits the vibrations and thus its wear. Besides, as the supply of energy for the pitch variation mechanism is separated from the mechanical transmission device, it avoids compromising the power supply for the pitch variation mechanism in case of breakdown of the mechanical transmission device.

Preferably, the planetary gear train is mounted in a ring gear shaft integral with the ring gear, the ring gear shaft including an internal circular groove arranged to get back the lube oil from the planetary gear train due to the centrifugal forces. So, the lube oil is centrifuged towards the ring gear shaft and retrieved in the circular groove, which facilitates the oil return towards the engine in view of its passage in an air-oil exchanger.

Still preferably, the circular groove is arranged upstream to the planetary gear train. The oil circulation system does not advantageously cross the planetary gear train, which simplifies the design of such a train.

Always preferably, drain ports are arranged in the ring gear so as to forward the lube oil located downstream to the planetary gear train towards the circular groove.

The invention also relates to a turbine engine for an aircraft including a contra-rotating propeller system such as previously mentioned. Preferably, the turbine engine is an <<open rotor>>.

BRIEF DESCRIPTION OF THE SEVERAL VIEWS OF THE DRAWINGS

The invention will be better understood by means of the attached drawings, in which.

DETAILED DESCRIPTION OF THE INVENTION

Typically, a turbine engine includes, from upstream to downstream, a low pressure compressor, a high pressure compressor, a combustion chamber, a high pressure turbine, and a low pressure turbine. Afterwards, the terms "upstream" and "downstream" are defined with regard to the circulation of the gases in the turbine engine, the gases circulating from upstream to downstream. Similarly, by agreement in the present application, the terms "internal" and "external" are radially defined with regard to the X-axis of the engine represented on FIGS. 1 to 4. So, a cylinder extending along the engine axis comprises an internal face directed towards the engine axis and an external surface, opposite to its internal surface.

The low pressure compressor and the low pressure turbine are mechanically connected by a low pressure shaft, so forming a low pressure spool, whereas the high pressure compressor and the high pressure turbine are mechanically connected by a high pressure shaft, forming a high pressure spool. The turbine engine is said a two-spool one.

Figure 1:
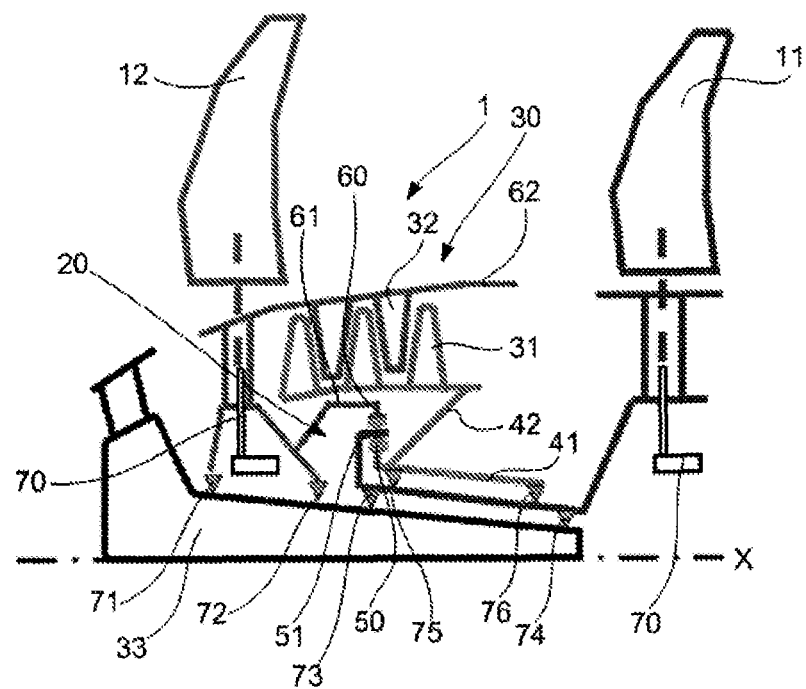
FIG. 1 is a schematic view of a propeller system according to the invention.

Referring to FIG. 1, a contra-rotating propeller system 1 for an aircraft turbine engine according to the invention comprises a free power turbine 30 including a first rotor 31 and a second rotor 32, the latter being contra-rotating with respect to said first rotor 31, first 11 and second 12 contra-rotating propellers intended to be rotated with regard to the casing 33 of the turbine engine around the axis of the propeller system, this axis being merged with the X-axis of the turbine engine.

Figure 5:
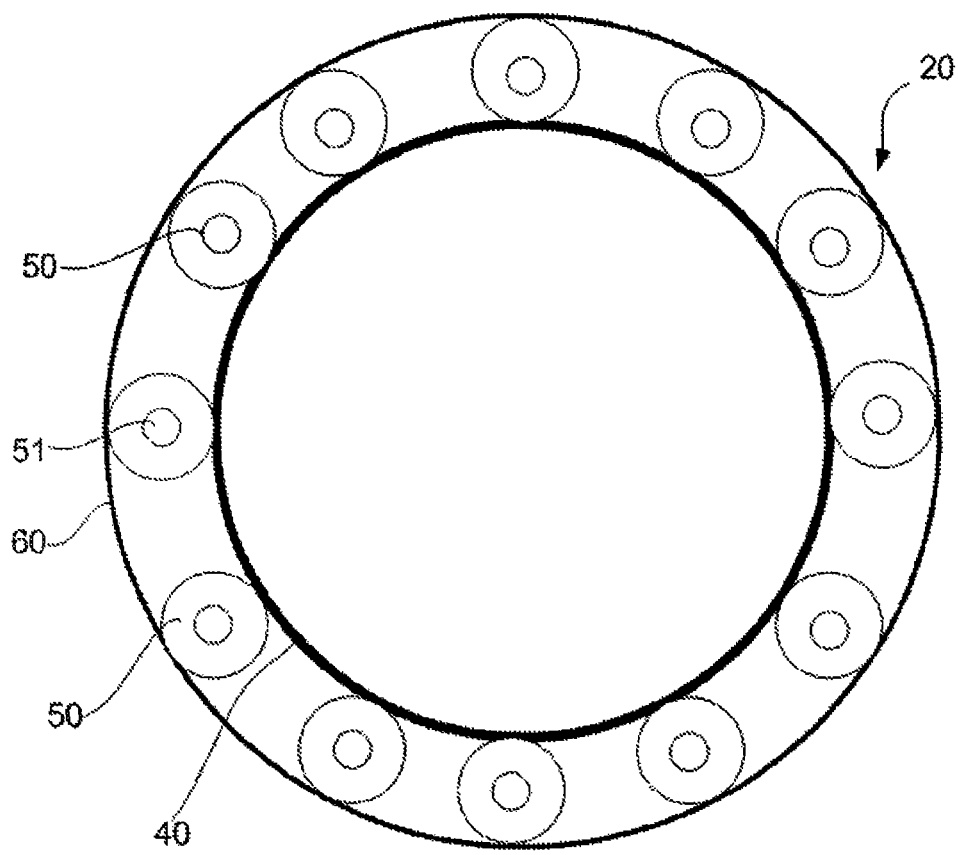
FIG. 5 is a schematic cross-section view of the planetary gear train of the propeller system according to the invention.

Referring to FIG. 5, the system 1 comprises a mechanical transmission device under the form of a planetary gear train 20, forming reducer, comprising a sun gear 40 concentric with said longitudinal X-axis and driven by said first rotor 31 of the free power turbine, planet gears 50 meshing with said sun gear 40, a planet carrier 51 driving said first propeller 11, as well as a ring gear 60, driven by said second rotor 32 meshing with each planet gear 50 and driving said second propeller 12, the mechanical transmission device being arranged between the first propeller 11 and the second propeller 12.

Referring to FIG. 1, the first propeller 11 is mounted downstream to the planetary gear train 20 whereas the second propeller 12 is mounted upstream. So, the inter-propeller gap arranged between upstream 12 and downstream 11 propellers is used to accommodate the free power turbine 30 of the turbine engine, which allows to advantageously reduce the length of the turbine engine and thus, its footprint.

Contrary to the application FR 0 858 822 filed on Dec. 19, 2008 by SNECMA company, wherein the contra-rotating propeller system is located downstream to the low pressure turbine, the propeller system 1 is here integrated further upstream in the turbine engine.

Referring to FIG. 1, the low pressure turbine 30, corresponding to the free power turbine, includes a first rotor 31, constituting the internal rotor of the low pressure turbine, and a second rotor 32, constituting the external rotor of this turbine, the second rotor 32 being also known under the name "external drum" by person skill in the art. The low pressure turbine 30 is mounted here in the stator 33 of the turbine engine, known by person skill in the art under the name <<outlet casing>>. The outlet casing 33 forms the statoric portion of the propeller system according to the invention and is concentric with the X-axis of the turbine engine. The outlet casing 33 extends axially and inwardly to the low pressure turbine 30.

The first propeller 11, named downstream propeller, and the second propeller 12, named upstream propeller, appear each under the form of a wheel comprising radial blades extending outwardly. In this example, the propeller system 1 is adapted so that the propellers have no radial fairing surrounding them, as seen in figures, the turbine engine being an <<open rotor>> one.

Figure 2:
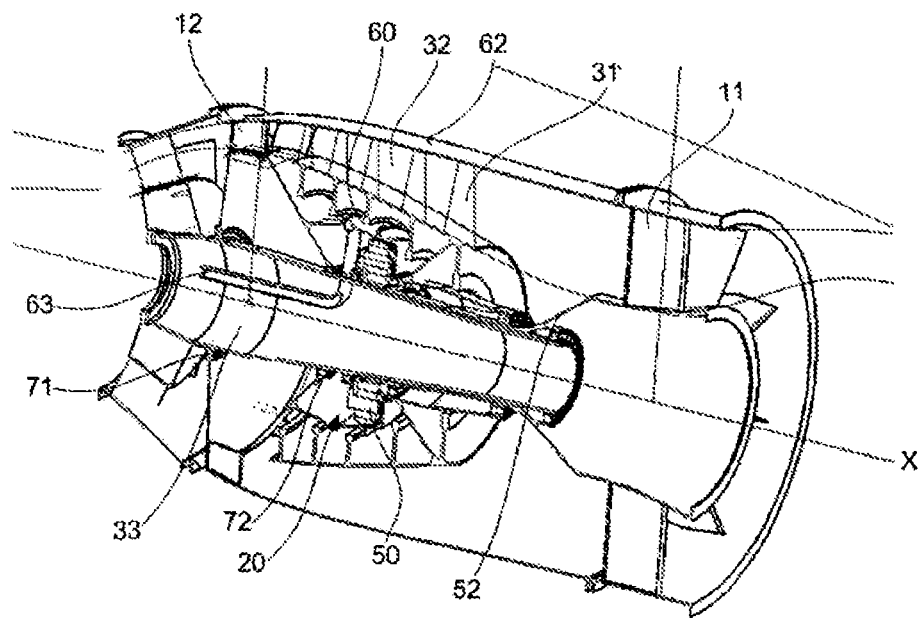
FIG. 2 is a longitudinal section view of a propeller system for an aircraft according to a preferred embodiment of the present invention.

Referring to FIG. 2, the propellers 11, 12 are axially shifted each other, the planetary gear train 20 being mounted between them. In other words, the turbine engine axially includes, from upstream to downstream, the upstream propeller 12, the planetary gear train 20 and the downstream propeller 11. Both propellers 11, 12 are arranged to turn in opposite directions about the X-axis of the turbine engine with which they are concentric, the rotations being made with regard to the casing 33 which remains stationary. Both propellers 11, 12 are driven by the planetary gear train 20.

Figure 3:
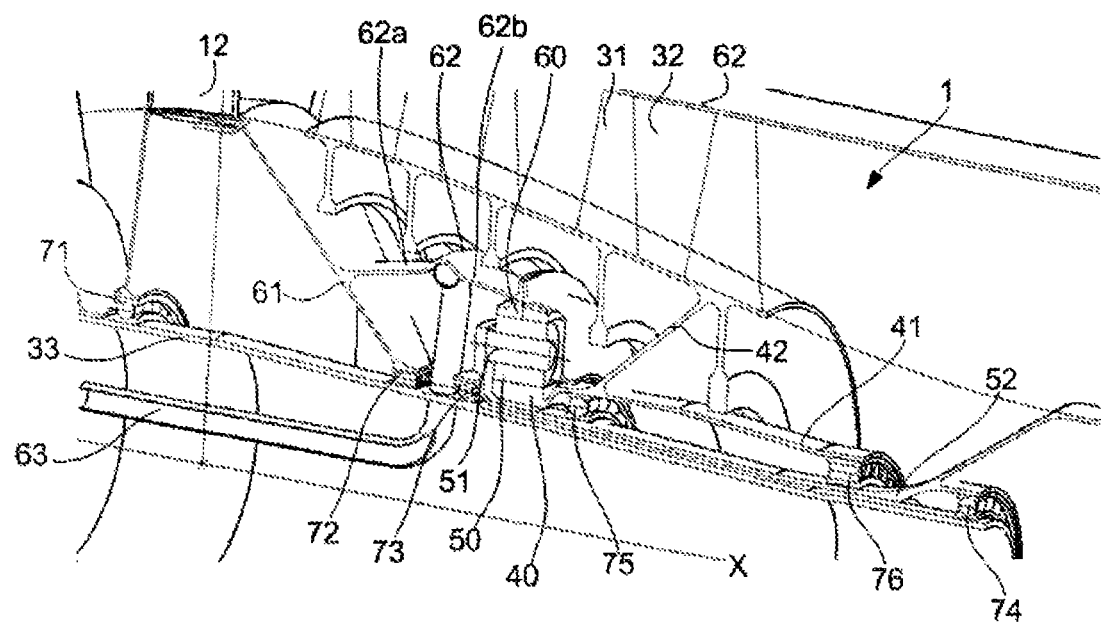
FIG. 3 is an enlarged view of the propeller system of FIG. 2.
Figure 4:
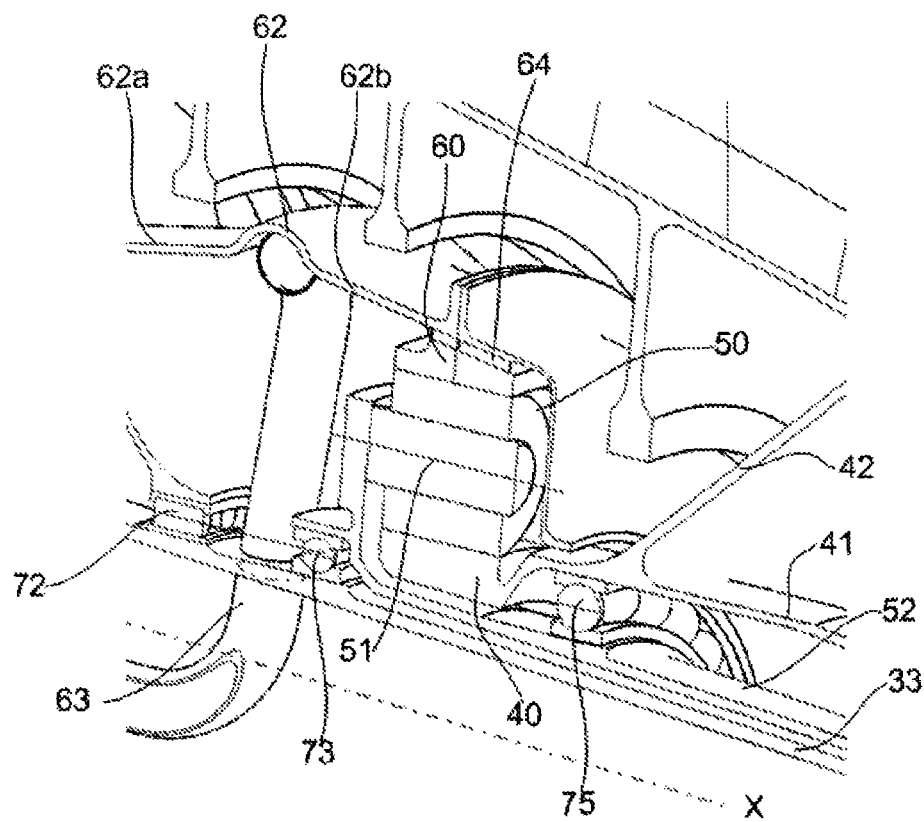
FIG. 4 is an enlarged view of the propeller system of FIG. 3.

Referring to FIG. 5, the sun gear 40 of the planetary gear train 20 appears under the form of a wheel the external surface of which is toothed and which is concentric with the X-axis of the turbine engine. Referring to FIGS. 3 and 4, the sun gear 40 is downstream connected with a longitudinal planetary shaft 41 extending along the X-axis of the turbine engine.

The planetary shaft 41 is rotatably integral with the first rotor 31 by means of a tapered flange 42. When gases coming from the combustion chamber cross the low pressure turbine of the turbine engine, the first rotor 31 directly rotatably drives the sun gear 40.

Referring further to FIG. 5, the planet gears 50 of the planetary gear train 20 appear under the form of wheels the toothed external surface of which meshes with the toothed external surface of the sun gear 40. Each planet gear 50 is carried by a planet shaft 51 having off-centered axis with regard to the X-axis of the turbine engine. The planetary gear train 20 is provided with a planet carrier 52, concentric with the X-axis of the turbine engine, rotatably carrying the planet gears 50 through their planet shafts 51. The planet carrier 52 appears under the form of a longitudinal shaft coaxial with the planetary shaft 41, the planetary shaft 41 being rotatably mounted outside the planet carrier 52 through bearings 75, 76 which are afterwards named planetary bearings 75, 76.

The planetary shaft 41 has a relatively substantial diameter in order to accommodate the planetary bearings 75, 76 and the planet carrier 52. It is so possible to provide a greater number of planet gears 50 (here twelve), having a reduced size, between the sun gear 40 and the ring gear 60 as represented in FIG. 5. The planetary gear train 20 so obtained has a lower reducing ratio for reduced global dimensions and lower mass comparing to a planetary gear train according to prior art.

For an engine according to prior art, a low reducing ratio (about 4) would cause an imbalance between the torque to the upstream propeller and the torque to the downstream propeller. According to the invention, the second rotor advantageously compensates for this lack of torque as it will be detailed afterwards.

The planet carrier 52 is integral with the first propeller 11 downstream to the planetary gear train 20, as seen in FIGS. 1 and 2, so as to directly rotatably drive it. Referring to FIG. 3, the planet carrier 52 is supported by planet carrier bearings 73, 74 with regard to the casing 33 of the turbine engine. As the downstream propeller 11 is directly supported with regard to the casing 33, it limits the occurrence of unbalances and vibrations which can be felt by passengers of the aircraft on which the turbine engine is mounted.

Still referring to FIG. 5, the ring gear 60 of the planetary gear train 20 appears under the form of an axial cylinder including projecting teeth radially inwardly towards the turbine engine. The ring gear 60 is concentric with the X-axis of the turbine engine and is carried by a ring gear shaft 61 having the same axis, the ring gear 60 meshing inwardly with the planet gears 50 as seen in FIG. 5.

The ring gear shaft 61 extends upstream from the planetary gear train 20 and is integral with the second propeller 12, so as to directly rotatably drive it. Referring to FIG. 4, the ring gear shaft 61 extends upstream to the planetary gear train 20 whereas the planet carrier shaft 52 extends downstream to the planetary gear train 20. So, the downstream 11 and upstream 12 propellers are on both sides of the planetary gear train 20. The ring gear shaft 61 is rotatably mounted outwardly to the casing 33 of the turbine engine through ring gear bearings 71, 72.

The ring gear shaft 61 is integral with the second rotor 32, by means of a flange. So, a part of the power is directly transferred from the second rotor 32 to the upstream propeller 12 without passing by the planetary gear train 20.

So, the second rotor 32 directly contributes to the driving of the ring gear 31, and thus to the driving of the upstream propeller 12. A unitary ratio between the torques respectively transferred to the downstream propeller 11 and to the upstream propeller 12 can be obtained, for obtaining a better efficiency of the turbine engine.

Referring to FIG. 1, each propeller is provided with a pitch variation mechanism of its blades. Preferably, each system is accommodated in a cavity arranged below each propeller. The power supply for each mechanism (electric or hydraulic) is made through a protrusion projecting towards the downstream of the outlet casing 33. The planetary gear train 20 is axially shifted with regard to the variation mechanisms 70 for the pitch of the propellers 11, 12. So, in case of breakdown of the planetary gear train 20 or of overheating of the latter, there are no harmful consequences for the pitch variation mechanisms of the propellers.

Given the substantial power transferred by the reducer, it is necessary to discharge an important amount of heat from said reducer. For that purpose, a lubrication circuit allows to cool the reducer, its oil rate being about 5000 liters per hour.

Following to the movement of the reducer upstream to the engine, it is necessary to modify the lubrication circuit of the reducer. In prior art, the lubrication circuit should cross the planet carrier of the reducer, which presented a drawback.

Referring to FIGS. 3 and 4, the reducer is accommodated in the rotary ring gear shaft 61 which is immerged in lube oil. The lube oil of the reducer is then drawn, under the influence of the centrifugal forces, against the internal surface of the ring gear shaft 61. The oil is said "centrifuged".

In order to facilitate the recovery of the lube oil, a circular recovery groove 62 is provided in the ring gear shaft 61, extending transversely to the engine axis, arranged upstream to the planetary gear train 20 in the internal surface of the ring gear shaft 61, the groove 62 having a radial opening directed inwardly.

In order to allow the lube oil located downstream to the reducer to reach the recovery groove 62, drain ports 64 are arranged in the ring gear 60. Referring more particularly to FIG. 4, the drain ports 64 extend in the ring gear 60 and emerge right through from the latter so as to communicate the volume of the ring gear shaft 61 located downstream to the reducer with its volume located upstream. The drain ports 64 extend here obliquely, from upstream towards downstream, inwardly to the engine, so as to facilitate the circulation of the lube oil towards the upstream volume under the influence of the centrifugal forces.

In order to facilitate the recovery of the lube oil, the circular groove 62 is arranged in an annular cup of the ring gear shaft 61 defining an upstream skew slope 62a extending outwardly, from upstream towards downstream, and a downstream skew slope 62b extending inwardly, from upstream towards downstream. So, the lube oil is guided by the skew slopes 62a, 62b to be retrieved in the circular groove 62. The oil return is assured by a plurality of tubes 63 which, from upstream to downstream, longitudinally extend in the outlet casing 33, radially cross it straight on the circular groove 62 to emerge in said circular groove 62. The end of the tubes 63 is opened here and tangentially directed, i.e. perpendicularly to the radial direction, so as the lube oil retrieved in the circular groove 62 is drawn in the tubes 63 during the rotation of the ring gear shaft 61. The tubes 63, here three of them, allow to bail out the lube oil in the circular groove 62.

After recovery, the lube oil is forwarded upstream to the engine by the tubes 63 towards an air-oil exchanger which is preferably mounted in a case of secondary equipments of the engine. Advantageously, as a part of the power (about 20%) is directly transferred from the second rotor 32 to the upstream propeller 12 without passing by the planetary gear train 20, the heat generated inside the reducer is then lower comparing to an engine according to prior art. It allows to advantageously reduce the oil rate for the cooling of the planetary gear train 20 and, consequently, to limit the dimensions of the air-oil exchanger and thus its drag.

The invention claimed is:

1. A contra-rotating propeller system for an aircraft turbine engine in which gases circulate from an upstream to a downstream of said turbine engine, comprising:
    a free power turbine including a first rotor and second contra-rotating rotor relative to the first rotor;
    first and second contra-rotating propellers to be rotated about a longitudinal axis of the propeller system relative to a stator of the system; and
    a mechanical transmission device including planetary gear train including:
    (i) a sun gear concentric with the longitudinal axis and driven by the first rotor of the free power turbine,
    (ii) planet gears meshing with the sun gear,
    (iii) a planet carrier driving the first propeller, and
    (iv) a ring gear meshing with each planet gear, the ring gear, driven by the second rotor, driving the second propeller,
    wherein the mechanical transmission device is arranged between the first propeller and the second propeller.

2. A system according to claim 1, wherein the first propeller is arranged downstream from the mechanical transmission device and the second propeller is arranged upstream from the mechanical transmission device.

3. A system according to claim 1, wherein the first rotor of the free power turbine is an internal rotor, and the second rotor of the free power turbine is an external rotor.

4. A system according to claim 1, wherein the planet carrier is integral with the first propeller, and the ring gear is integral with the second propeller and the second rotor of the free power turbine.

5. A system according to claim 1, wherein the planet carrier is rotatably mounted with regard to the stator via planet carrier bearings and the ring gear is rotatably mounted with regard to the stator via ring gear bearings.

6. A system according to claim 1, wherein the planetary gear train is mounted in a ring gear shaft integral with the ring gear and immerged in lube oil, the ring gear shaft including an internal circular groove arranged to get back said lube oil from the planetary gear train under influence of centrifugal forces.

7. A system according to claim 6, wherein the circular groove is arranged upstream from the planetary gear train.

8. A system according to claim 7, wherein drain ports are arranged in the ring gear so as to forward the lube oil located downstream from the planetary gear train towards the circular groove.

9. A turbine engine for an aircraft including a contra-rotating propeller system according to claim 1.

10. A turbine engine according to claim 9, which is an open rotor.

* * * * *